United States Patent [19]
Cloud et al.

[11] Patent Number: 5,743,728
[45] Date of Patent: Apr. 28, 1998

[54] METHOD AND SYSTEM FOR MULTI-STAGE CALCINING OF GYPSUM TO PRODUCE AN ANHYDRITE PRODUCT

[75] Inventors: Michael L. Cloud, Canton; Kirk S. Moore, Okeene, both of Okla.

[73] Assignee: USG Corporation, Chicago, Ill.

[21] Appl. No.: 515,265

[22] Filed: Aug. 15, 1995

[51] Int. Cl.$^6$ ............................................. F27B 14/00
[52] U.S. Cl. .......................... 432/151; 432/58; 432/135; 432/197; 432/214; 432/223
[58] Field of Search ........................ 432/151, 221, 432/223, 214, 215, 218, 197, 135, 58

[56] References Cited

U.S. PATENT DOCUMENTS

| | | | |
|---|---|---|---|
| 2,261,872 | 11/1941 | Choate . | |
| 3,236,509 | 2/1966 | Blair | 263/21 |
| 3,307,840 | 3/1967 | Conroy, Jr. | 263/21 |
| 3,307,915 | 3/1967 | Conroy et al. . | |
| 3,378,246 | 4/1968 | Leding | 263/26 |
| 3,576,599 | 4/1971 | Anderson et al. . | |
| 3,669,435 | 6/1972 | Silverberg | 432/151 |
| 3,871,829 | 3/1975 | Keith et al. | 23/279 |
| 3,901,645 | 8/1975 | Rowland | 432/16 |
| 4,113,836 | 9/1978 | O'Conner | 432/151 |
| 4,117,070 | 9/1978 | O'Neill | 264/234 |
| 4,161,390 | 7/1979 | Page et al. . | |
| 4,176,157 | 11/1979 | George et al. . | |

(List continued on next page.)

FOREIGN PATENT DOCUMENTS

| | | |
|---|---|---|
| 169737 | 8/1904 | Germany . |
| 1 558 080 | 1/1972 | Germany . |
| 1018464 | 1/1966 | United Kingdom . |
| 1087549 | 10/1967 | United Kingdom . |
| 1198807 | 7/1970 | United Kingdom . |
| 1488665 | 10/1977 | United Kingdom . |
| 2 043 219 | 10/1980 | United Kingdom . |

OTHER PUBLICATIONS

Page from Babcock—BSH catalog showing rotary drum calciners with coolers. Germany. Such rotary calciners were first used in 1925.

Page from Krupp Polysius catalog showing POLCAL calcining system. Netherlands. One such calcining system was in use starting in 1993.

British Gypsum Limited "High Efficiency Calcining of Gypsum", 1988, pp. 1–8.

*Primary Examiner*—Henry A. Bennett
*Assistant Examiner*—Jiping Lu
*Attorney, Agent, or Firm*—Tilton, Fallon, Lungmus & Chestnut

[57] ABSTRACT

A method and system for calcining gypsum to recover gypsum in a form consisting essentially of calcium sulfate anhydrite is disclosed. The method includes the steps of feeding the ground gypsum material into a first kettle and heating the ground gypsum in the first kettle to the first predetermined temperature. The first predetermined temperature is preferably below 400° F. so that the gypsum will still contain a sufficient amount of chemically-combined water so that it will self-fluidize by release of water vapor so that it will flow through the apparatus. The ground gypsum is then overflowed through at least one subsequent stage and heated to a final predetermined temperature to produce an anhydrite product. To produce insoluble calcium anhydrite or dead burn material, the final predetermined temperature is greater than 900° F. and preferably within the range of about 900° F.–1300° F. In the subsequent stages, the gypsum powder is heated and simultaneously fluidized with a fluidizing media, preferably air, so that the ground gypsum will flow through the apparatus. In the preferred embodiment, the ground gypsum is fluidized by a plurality of mixing blades having air injection pipes along their breaking edges for injecting air into the gypsum and a plurality of air injection nozzles disposed radially about a periphery of the kettles. The fluidization of the ground gypsum in the subsequent stages ensures that it will flow through the apparatus for production of an anhydrite product.

12 Claims, 5 Drawing Sheets

U.S. PATENT DOCUMENTS

| | | | |
|---|---|---|---|
| 4,188,186 | 2/1980 | Ladwig | 432/151 |
| 4,215,981 | 8/1980 | Von Dreusche, Jr. | 432/151 |
| 4,227,873 | 10/1980 | Manshausen et al. | 432/151 |
| 4,238,238 | 12/1980 | Kinkade et al. . | |
| 4,522,587 | 6/1985 | Miller | 432/151 |
| 4,533,528 | 8/1985 | Zaskalicky | 423/171 |
| 4,576,573 | 3/1986 | Ruehenbeck | 432/197 |
| 4,626,199 | 12/1986 | Bounini | 432/58 |
| 4,629,419 | 12/1986 | Ward et al. | 432/13 |
| 4,744,961 | 5/1988 | Bounini . | |
| 4,744,963 | 5/1988 | Dozsa et al. | 423/171 |
| 4,915,623 | 4/1990 | Ball et al. . | |
| 5,007,825 | 4/1991 | Williams | 432/99 |
| 5,011,668 | 4/1991 | Ball et al. | 432/58 |
| 5,139,749 | 8/1992 | White . | |

METHOD AND SYSTEM FOR MULTI-STAGE CALCINING OF GYPSUM TO PRODUCE AN ANHYDRITE PRODUCT

BACKGROUND AND SUMMARY

This invention relates to methods and devices for calcining gypsum material, and more particularly, to a method and system for calcining gypsum to recover calcium sulfate anhydrite which is often referred to, in insoluble form, as "dead burn".

Many methods and devices for calcining gypsum are well known. Traditionally, refractories have been used to calcine gypsum in large kettles having a thickened dome-shaped bottom, and the kettle is heated by gas-fired flames in a brick refractory structure. (See U.S. Pat. No. 3,236,509). However, using a refractory to calcine gypsum results in an extreme waste of energy due to the excessive amount of heat which must be applied to the kettle to heat the gypsum contained therein, and the refractory brick enclosure is also inefficient since it has a large footprint and occupies valuable factory space. Other calcining methods and devices have taken the form of refractoryless kettles which use submerged combustion heating systems within the kettle such as disclosed in U.S. Pat. Nos. 4,626,199, 4,629,419 and 4,744, 961. One major objective of both refractory and refractoryless kettles for calcining gypsum has been to produce calcium sulfate hemihydrate, better known as stucco, for use in the production of wallboard.

In contrast to such prior art methods which were concerned with production of hemihydrate or stucco, the method and system of this invention are concerned primarily with recovering gypsum material from the calcining process which consists essentially of calcium sulfate anhydrite. The recovered anhydrite product may be in the form of soluble calcium sulfate anhydrite which is slightly unstable or more preferably is recovered in the form of insoluble calcium sulfate anhydrite which is stable and often referred to as dead burn. Dead burn material has many applications including as a filler in thermoplastics, herbicides, foods and pharmaceuticals, cement, plaster additives, etc. However, the production of dead burn is difficult.

Raw gypsum is generally in the form of a dry powder and takes the form of $CaSO_4 \cdot 2H_2O$. When raw gypsum is heated to a temperature of generally about 250° F.–380° F. or even higher, the powder converts to hemihydrate which takes the form of $CaSO_4 \cdot \frac{1}{2}H_2O + 1\frac{1}{2}H_2O$. The $1\frac{1}{2}H_2O$ is in the form of water vapor and fluidizes the dry powder during the calcining process so that it will flow through the apparatus. When the hemihydrate is heated to even higher temperatures, the gypsum converts to soluble anhydrite or insoluble anhydrite $CaSO_4$ (dead burn). However, the $\frac{1}{2}H_2O$ released during conversion to soluble or insoluble anhydrite does not fluidize the powder very well.

Due to such fluidization problems, conventional refractory or refractoryless calcining methods to produce dead burn have been less than effective in efficiently and economically producing dead burn. Specifically, using a refractory for producing dead burn material is excessively expensive and cost prohibitive due to required temperatures of about 900° F. to 1300° F. The prior art refractoryless methods of calcining gypsum are more economical than using a refractory but are impractical for producing dead burn material due to fluidization problems. In addition, the anhydrite produced from such systems is often not evenly heated and still contains substantial amounts of chemically-combined water which make the anhydrite unsuitable as a filler for thermoplastics and other similar applications. Other methods of calcining gypsum to produce dead burn have included using flash calciners to produce dead burn. Such flash calciners entrain the ground gypsum in a stream of accelerated air which is then flash heated to elevated temperatures. However, such systems are limited in their capacity and flowthrough rate.

An important aspect of this invention therefore lies in providing a method for producing dead burn material in a cost effective and efficient manner which avoids the excess cost of a refractory and overcomes the fluidization problems which would otherwise occur in using prior art methods of calcining gypsum to produce dead burn. Such a method involves feeding the gypsum material through two or more stages of calcining to gradually convert the gypsum to dead burn material. In the first stage, the gypsum material contains chemically-combined water which is released by the heating process to self-fluidize the gypsum powder so that it will flow through the apparatus. The gypsum powder in the first stage is generally heated to form a hemihydrate product which occurs in a temperature range of about 250° F.–380° F., or generally less than 400° F. The material is then passed through at least one subsequent stage, preferably two or more stages, so that it is heated sufficiently to form calcium sulfate anhydrite. In the subsequent stages, the method includes the steps of heating and simultaneously fluidizing the material with a fluidization media, preferably air, so that it will flow through the subsequent stages of the system. The material is then recovered from the process in a form consisting essentially of calcium sulfate anhydrite. The recovered anhydrite product may be soluble or insoluble depending upon the desired application, and the insoluble anhydrite is generally referred to as dead burn material. For purposes of convenience, the term gypsum is generally used herein to describe the various forms of calcium sulfate, including dihydrate (gypsum), hemihydrate (stucco) and anhydrite (dead burn).

In one preferred embodiment of the method of this invention, the method involves three steps of calcining the gypsum through three calcining kettles to recover calcium sulfate anhydrite from the third kettle. In particular, the method comprises the steps of first feeding ground gypsum into a first kettle and heating the gypsum to a first predetermined temperature of about 250° F.–380° F., preferably about 310° F. The gypsum powder is in a hemihydrate state at such a temperature and the release of water vapor, by the reaction $CaSO_4 \cdot 2H_2O \rightarrow CaSO_4 \cdot \frac{1}{2}H_2O + 1\frac{1}{2}H_2O$, sufficiently fluidizes the powder so that it will flow through the process. The next step is to overflow the heated gypsum from the first kettle into a second kettle. The material in the second kettle is then heated to a second predetermined temperature and simultaneously fluidized with a fluidizing media, preferably air, in the second kettle. The second predetermined temperature is about 500° F.–800° F., preferably about 600° F. At such a temperature, the gypsum material will be a multi-phase material having relatively poor flow characteristics. However, the fluidization of the gypsum powder with a fluidizing media in the second kettle ensures that it will properly flow through the system. The gypsum powder is then overflowed from the second kettle into a third kettle where it is then heated to a third predetermined or final temperature and simultaneously fluidized with a fluidizing media. The gypsum powder is then recovered from the third kettle as a gypsum material consisting essentially of calcium sulfate anhydrite. In a method to produce insoluble calcium sulfate anhydrite or dead burn, the third predetermined or final temperature should be greater than about 900° F., preferably greater than about 930° F., to ensure the production of dead burn material. Generally, the third predetermined temperature should be in the range of about 900° F.–1300° F., and in one embodiment of the invention, the third predetermined temperature is about 1000° F.

The step of fluidizing the gypsum powder in the second and third kettles includes providing a fluidization means in those kettles for fluidizing the gypsum material contained therein. In a preferred embodiment, the fluidization means includes a plurality of mixing blades and air pipes provided along breaking edges of the mixing blades for injecting air through a plurality of radially-directed ports into the contents of the second and third kettles. Preferably, the mixing blades include a pair of horizontally-extending blades, and a pair of oppositely-oriented, helically-twisted blades which extend vertically between the first and second horizontal blades. The helical blades each include a leading edge, a trailing edge and a breaking edge, and the air pipes are positioned along the breaking edges with the injection ports directed towards the burner coils. The blades are preferably arranged around a central axle, and an air source may be connected to the central axle which is then connected with the air pipes along the leading edges of the helical blades.

In the preferred embodiment, the fluidization means also includes a plurality of radially-arranged air injection nozzles positioned about a periphery of the kettle shells of the second and third kettles. Each air injection nozzle includes a plurality of air injection ports, and the nozzles are each connected to a pressurized air line for injecting pressurized air through the ports and into the contents of the kettle. The pressurized air sufficiently fluidizes the ground gypsum at elevated temperatures so that it will adequately flow through the system.

In an alternate construction, the fluidization means may include a perforated screen and a woven web or mat positioned in the bottom of the second and third kettles and a pressurized air chamber located below the screen and mat for injecting air through the screen and mat and into the interior of the kettle. Air is blown into the air chamber and through the screen and mat throughout the gypsum material at elevated temperatures so that the ground gypsum material will flow through the second and third stages of the apparatus.

The fluidization means is preferably formed of the combination of the helical mixing blades and air pipes along the leading edges of those blades as well as a plurality of radially-arranged air injection nozzles. However, the air injection nozzles may be replaced with use of an air chamber and perforated sheet and web in the bottom of the kettles. The fluidization means may also take a variety of other forms of means for fluidizing or aerating the gypsum powder in the kettles during the second and third stages when the gypsum powder does not sufficiently self-fluidize.

Other objects, features, and advantages will become apparent from the following description and drawings.

DETAILED DESCRIPTION OF THE PREFERRED EMBODIMENTS

Referring to the drawings, the numeral 10 generally designates a multi-stage calcining system for use in the method of the present invention. In embodiment given in the drawings, the multi-stage calcining system 10 includes a first kettle 11, a second kettle 12, and a third kettle 13. Each of the kettles is designed for calcining gypsum and many of the details of the construction and operation of such kettles are fully disclosed in co-owned pending application Ser. No. 08/382,612, filed on Feb. 2, 1995, entitled "Method and Apparatus for Continuous Refractoryless Calcining of Gypsum", which is hereby incorporated by reference. However, it will be understood that other types of kettles may be used. The method and system of this invention must include at least two stages of calcining and include two or more kettles. In the embodiment shown in the drawings, the system 10 includes three kettles 11–13 for three stages of calcining and in one embodiment, each of the kettles has a height of about 5% feet and a diameter of about 5½ feet. However, it will be understood that four and five stages of calcining or other embodiments of two or more stages may be used in practicing the invention which is not limited to any particular calcining system or number of stages.

Figure 1:
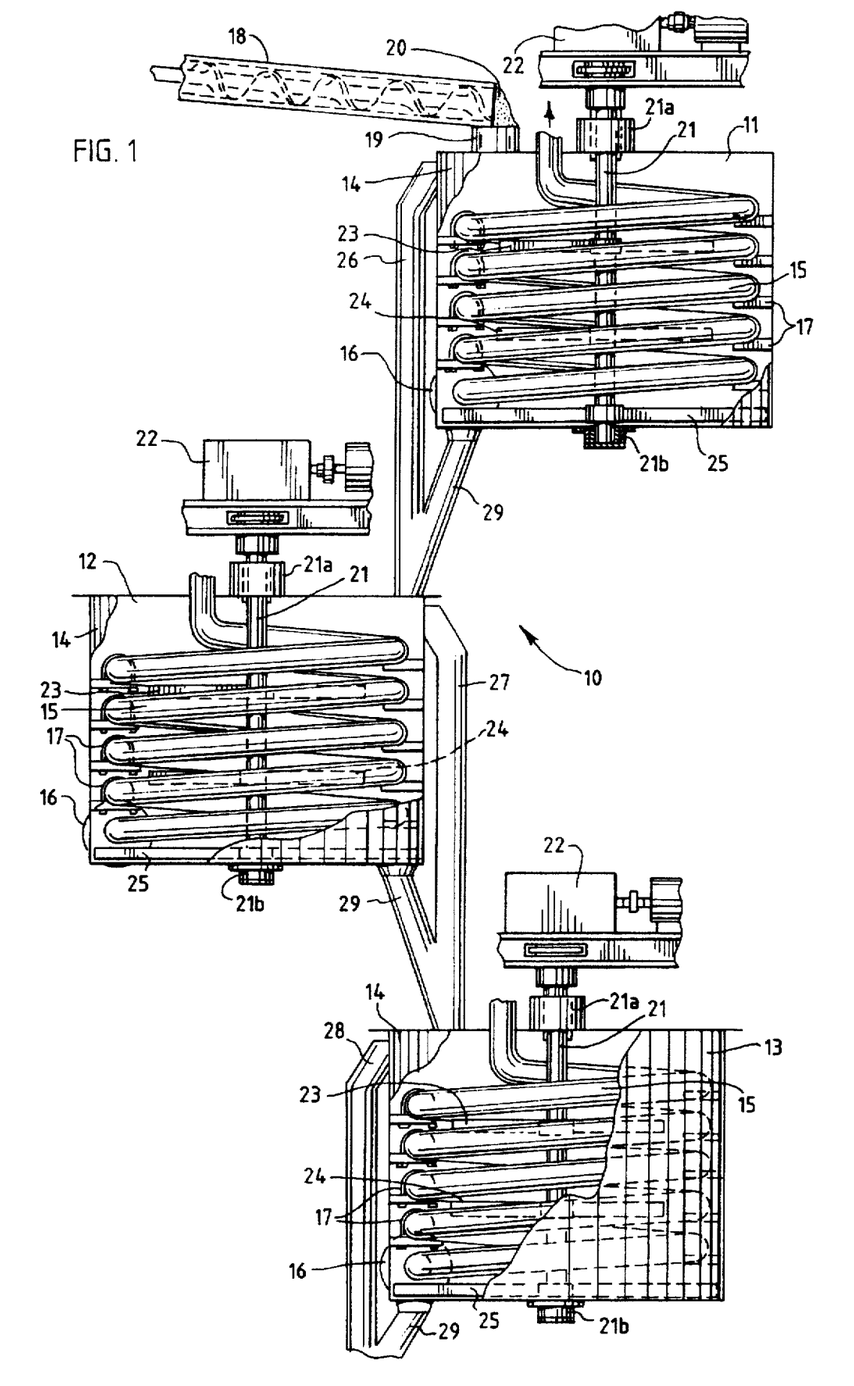
FIG. 1 is a side, partially fragmentary, elevational view illustrating a three-stage kettle construction for use in the method of the present invention.

Referring to FIG. 1, each of the kettles 11–13 includes a kettle shell 14, an internal coil-type burner tube assembly 15, and an external immersion tube burner 16. The burner tube coils 15 are supported by brackets 17 within kettle shells 14 and are arranged in a spiral fashion for uniformly heating the gypsum material contained therein. The immersion burners 16 are gas-fired burners which project a flame into the burner tubes 15, and the heat rises within the tubes so that the heated media, typically combustion gases and air, flows through the tubes to uniformly heat the contents of the kettle shells 14. Such gas-fired immersion tube burners are commercially available from many sources, including Pillard Combustion (Procedair) of Montreal, Quebec, Canada; Eclipse Combustion of Rockford, Ill.; Maxon Corporation of Muncie, Ind.; and Hauck Manufacturing Co. of Lebanon, Pa. Currently, such gas-fired immersion tube burners have a capacity limitation of about 5,000,000 BTU and the particular capacity of the selected burners 16 will depend upon the desired output temperature of the particular kettle and the interior capacity of the kettle, among other factors. In one embodiment, each of the immersion tube burners had a capacity of 5.3 mm/BTU/hr. Such immersion tube burners 16 can be run on a variety of fuels, including liquified petroleum or natural gas. However, use of fuels such as coal or oil should be avoided since the exhaust gases from the flames of such fuels may leave an unwanted interior coating or residue on the interior of the burner tubes 15. While it is believed that the use of such gas-fired immersion tube burners 16 is preferable, other heat sources for circulating a heated media, such as steam, oil or the like, could be used for circulating a heated media through the burner tube coils 15 and heating the kettle contents. While such alternate sources of heat may be used, such sources must be capable of obtaining a final temperature of the gypsum powder of greater than 900° F., preferably above 930° F., to convert the gypsum powder to insoluble calcium sulfate anhydrite or dead burn. It will also be understood that the method of this invention can be used with many types of such refractoryless calcining kettles and that the method is not limited to operation with any one particular type of refractoryless calcining kettle.

Figure 2:
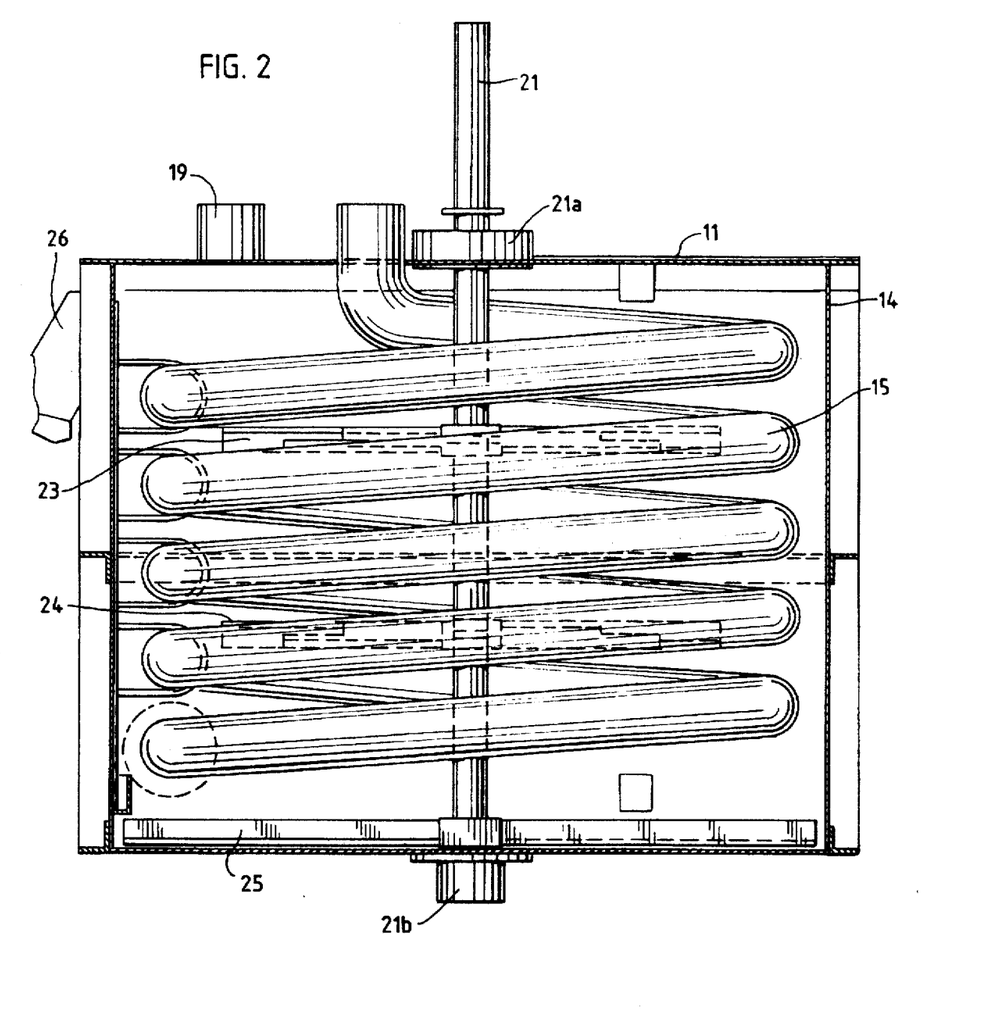
FIG. 2 is a side, partially sectional, elevational view illustrating the interior of the first kettle of the calcining system shown in FIG. 1.

Referring to FIGS. 1 and 2, a conventional feed conveyor 18 is provided over an input riser 19 in first kettle 11 for feeding ground gypsum powder 20 into first kettle 11. Mixing means are also provided in the first kettle 11 for mixing the ground gypsum contained therein so as to avoid dead spots in the heating of the ground gypsum. In the embodiment given in FIGS. 1 and 2, the mixing means take the form of a central shaft 21 mounted on bearings 21a and 21b and connected to a drive means 22 for rotating shaft 21. Shaft 21 includes a plurality of horizontally-extending mixing blades 23, 24 and 25 for mixing the ground gypsum contained in the first kettle 11. Each of the first, second and third kettles 11–13 are shown in FIG. 1 as including such a mixing means for mixing the kettle contents. However, it will be understood that the mixing means may take various forms and may be omitted or be of significantly different construction in the second and third kettles 12 and 13 in some constructions as will be described in more detail hereinafter.

In operation, the feed conveyor 18 feeds ground gypsum 20 through riser 19 into first kettle 11, and the burner 16 and the burner tubes 15 in first kettle 11 heat the ground gypsum contained therein to a first predetermined temperature. The gypsum is heated in first kettle 11 to a temperature of about 250° F.–380° F., preferably about 310° F. Such heating of the gypsum powder causes it to be self-fluidized by the water vapor released from the reaction of $CaSO_4 \cdot 2H_2O \rightarrow CaSO_4 \cdot \frac{1}{2}H_2O + 1\frac{1}{2}H_2O$ so that the powder will adequately flow out of first kettle 11 and through the system. When first kettle 11 is so heated, the released water vapor and the addition of more gypsum powder causes the heated gypsum material to overflow through an overflow tube 26 from first kettle 11 into second kettle 12. Generally, the material which is overflowed from the first kettle 11 into the second kettle 12 is in the form of calcium sulfate hemihydrate. However, for purposes of convenience, the various forms of calcium sulfate, including dihydrate, hemihydrate and anhydrite, will be generally referred to as gypsum material or powder to simplify the discussion.

When the ground gypsum fills the second kettle 12, the burner 16 and burner tube 15 in second kettle 12 heat the ground gypsum contained therein to a second predetermined temperature of about 500° F.–800° F., preferably about 600° F. The gypsum material at the second predetermined temperature will be a multi-phase product containing very little chemically-combined water and having poor flow characteristics due to absence of released water vapor such as in the first kettle 11. However, as will be described in more detail hereinafter, the second kettle 12 is provided with fluidization means for fluidizing the gypsum in the second kettle 12 with a fluidization media, preferably air, so that it will flow through the apparatus. When heated in kettle 12, the gypsum overflows through overflow tube 27 from second kettle 12 and into third kettle 13.

The ground gypsum flowing through overflow tube 27 fills third kettle 13, and burner 16 and burner tubes 15 in third kettle 13 heat the ground gypsum contained therein to a third predetermined temperature of about 900° F.–1300° F., preferably about 1000° F. The third predetermined temperature should be greater than 900° F., preferably greater than 930° F., to ensure that the recovered gypsum from third kettle 13 will consist essentially of insoluble calcium sulfate anhydrite or dead burn material. However, the third predetermined temperature should generally not exceed 1300° F. by any significant amount such as would cause the anhydrite to disassociate to lime. The dead burn material is then recovered from third kettle 13 by overflowing it through a third overflow tube 28 and into a suitable receptacle. If desired, the ground gypsum recovered from the third kettle 13 may consist essentially of soluble calcium sulfate anhydrite, and a third predetermined temperature should be lower than 900° F. if production of soluble anhydrite is desired. Due to the elevated temperatures in the third kettle, the ground gypsum will have poor flow characteristics and the third kettle 13 is also provided with fluidization means for facilitating flow of the ground gypsum through the apparatus. The fluidization means provided in the second and third kettles 12 and 13 may be the same or different as will be described in more detail hereinafter.

Referring to FIG. 1, each of the first, second and third kettles 11–13 has a discharge tube 29 running from a bottom of the kettle to the overflow tubes 26, 27 and 28, respectively. The discharge tubes 29 are provided only for emptying the kettles 11–13 when the process is shut down, and the overflow tubes 26–28 are the primary means for transferring the gypsum powder from one kettle to another. While the overflow tubes 26 and 27 are shown as leading directly from first kettle 11 to second kettle 12 and from second kettle 12 to third kettle 13, it will be understood that other communication means between the kettles could be used. For example, the overflow tubes 26 and 27 could discharge onto a conveyor system which would then transport the gypsum to an input riser of the subsequent kettle.

The fluidization means in the second and third kettles 12 and 13 may take the form of various constructions for ensuring that the ground gypsum material, when it is heated to the second and third predetermined temperatures, will flow through the calcining apparatus or system 10. The fluidization means may include a number of different means for fluidizing the gypsum powder and varying combinations thereof. Three different methods or systems of fluidizing the gypsum powder will now be described, in connection with FIG. 3, FIGS. 4–7, and FIGS. 8–9, respectively. The preferred combinations of the different fluidization means will then be described.

Figure 3:
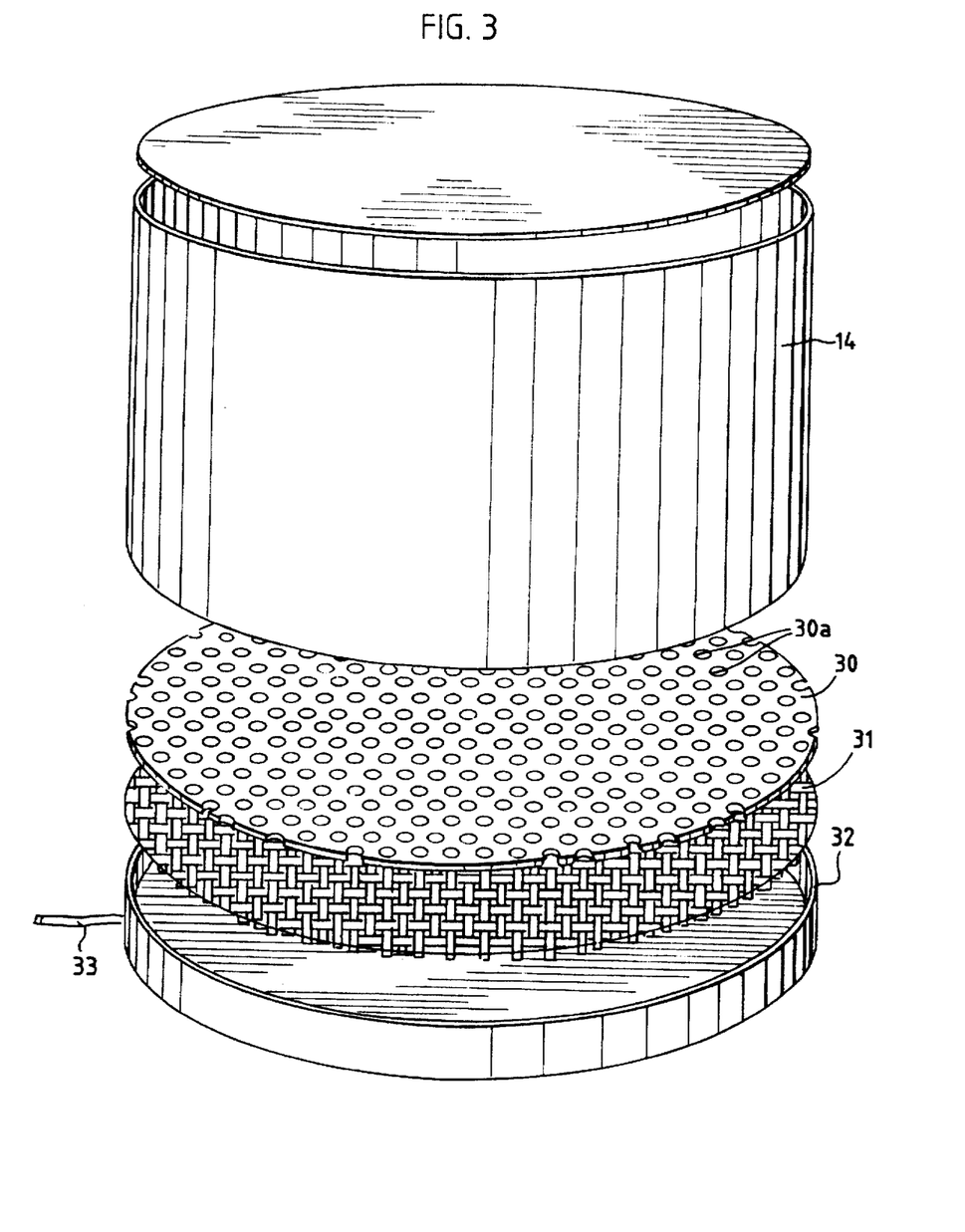
FIG. 3 is an exploded elevational view illustrating one embodiment of the fluidization means for the second and third kettles of the calcining system shown in FIG. 1.
Figure 4:
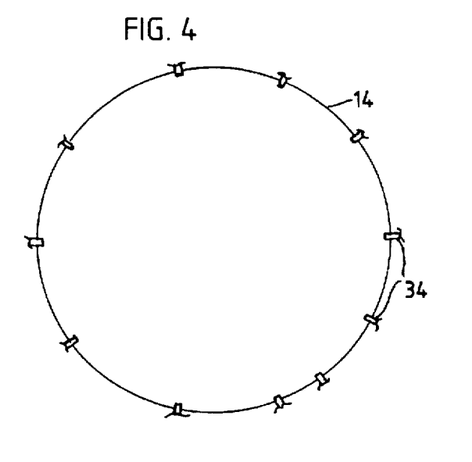
FIG. 4 is a schematic, cross-sectional, top view of an alternate embodiment of the fluidization means for the second and third kettles of the calcining system shown in FIG. 1.
Figure 5:
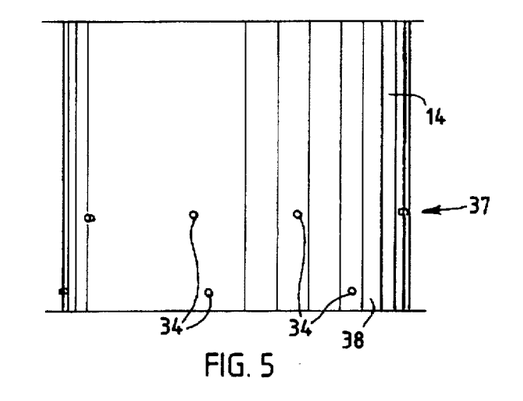
FIG. 5 is a schematic side view of the fluidization means shown in FIG. 4.
Figure 6:
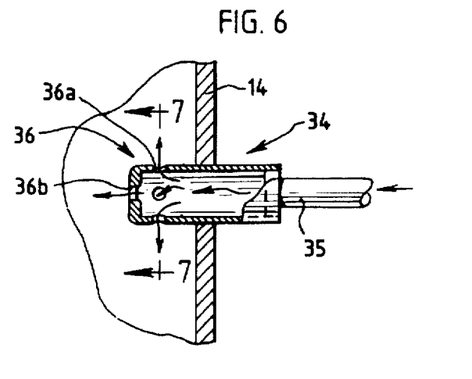
FIG. 6 is an enlarged sectional view of one of the nozzles of the fluidization means shown in FIGS. 4 and 5.
Figure 7:
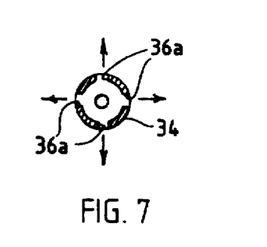
FIG. 7 is a front sectional view of the nozzle shown in FIG. 6.

In the construction shown in FIG. 3, the fluidization means includes a perforated sheet 30, a woven web or mat 31, and an air chamber 32 provided at the bottom of the second and third kettles 12 and 13. The perforated sheet 30 defines a plurality of apertures 30a and may be made of stainless steel or other heat-resistant materials. The woven mat 31 is formed of a loosely woven web of stainless-steel material or other heat-resistant material. The perforated sheet 30 primarily serves the purpose of protecting the woven mat 31 from being ripped or torn by contact with components which are being placed in the kettle or otherwise. In operation, an air line 33 is used to inject air below the woven mat 31 and perforated sheet 30, and the sheet 30 and mat 31 ensure that the air is uniformly distributed upwards through the ground gypsum material contained in the second and third kettles 12 and 13 to adequately fluidize that material. Preferably, the air injected through the ground gypsum material is preheated utilizing exchanged waste burner gases in a conventional heat exchanger system, and the fluidizing air is preferably heated to a temperature of about 200°–500° F. In such a construction, the second and third kettles 12 and 13 may include a mixing means as previously described in connection with FIGS. 1 and 2. However, the mixing means is preferably provided in combination with an aeration means as will be described hereinafter in more detail in connection with the embodiment shown in FIGS. 8 and 9.

In the construction shown in FIGS. 4–7, the fluidization means includes a plurality of air injection nozzles 34 which are radially spaced about a periphery of the kettle shells 14 of the second and third kettles 12 and 13. Each air injection nozzle 34 is connected to a pressurized air line 35, and each of the nozzles 34 defines a plurality of ports 36, including radial ports 36a and axial ports 36b. In the embodiment shown, a first set 37 of a plurality of nozzles 34 are provided circumferentially around the kettle shell 14 at one level while a second set 38 of a plurality of nozzles 34 are provided circumferentially about kettle shell 14 at another level. Both sets 37 and 38 are provided near the bottom of the kettle shell 14, and the air injected near the bottom of the shell 14 helps to force the heated gypsum material upward so that it will overflow into the respective overflow tubes 27 or 28. In such a construction, the second and third kettles 12 and 13 may include a mixing means as previously described in connection with the embodiment shown in FIGS. 1 and 2. However, the mixing means preferably includes an aeration means as described in more detail hereinafter in connection with the embodiments shown in FIGS. 8 and 9.

Figure 8:
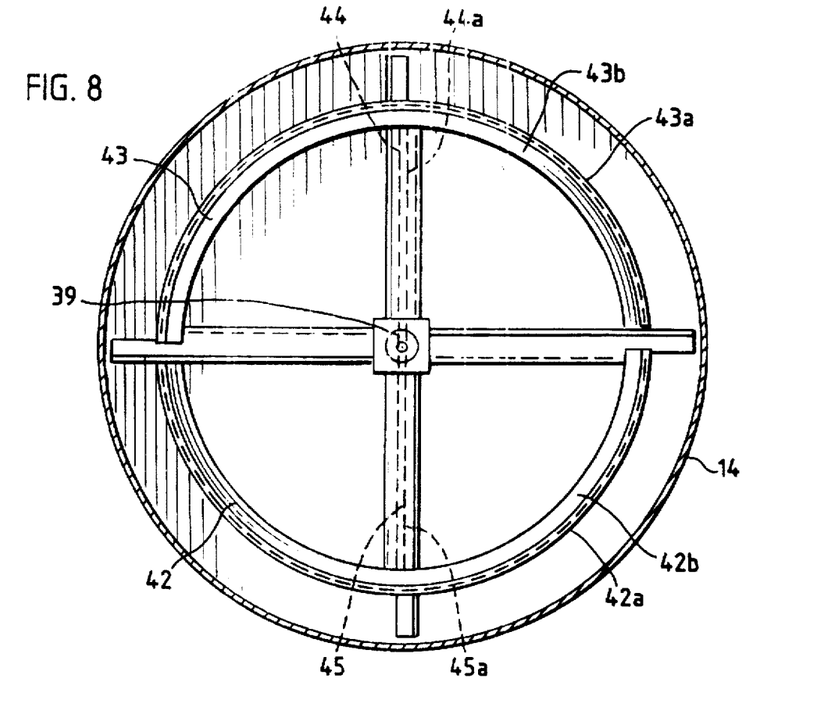
FIG. 8 is a top, partially sectional, view of another embodiment of the fluidization means for the second and third kettles of the calcining system shown in FIG. 1.
Figure 9:
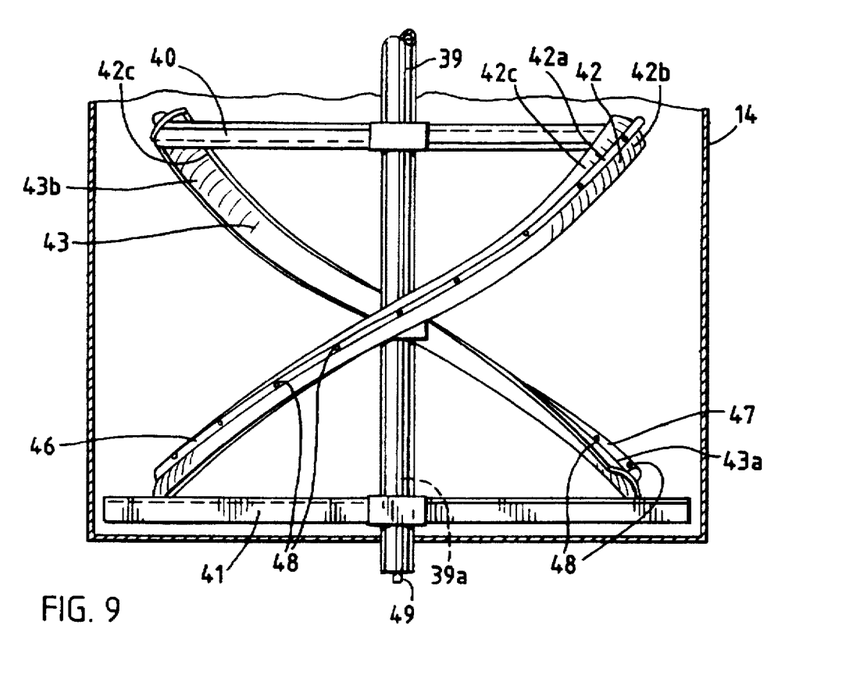
FIG. 9 is a side elevational view, partially in section, illustrating the alternate embodiment of the fluidization means shown in FIG. 8.

In the construction shown in FIGS. 8–9, the fluidization means includes a mixing and aeration means combination in which air injection means are provided along the leading edges of the mixing means for fluidizing the ground gypsum in the second and third kettles 12 and 13. In such a construction, the mixing means as previously described in connection with FIGS. 1 and 2 is omitted. In the particular embodiment shown in FIGS. 8–9, the mixing and aeration means combination includes a central axle 39, first and second horizontal blades 40 and 41, and first and second helical mixing blades 42 and 43. The helical mixing blades 42 and 43 extend vertically between the horizontal blades 40 and 41, and a pair of horizontal support bars 44 and 45 extend between central shaft 39 and intermediate portions of the helical mixing blades 42 and 43. Each helical mixing blade 42 and 43 has a breaking edge 42a and 43a, a leading edge 42b and 43b, and a trailing edge 42c and 43c. The blades 42 and 43 are designed to draw the gypsum powder towards the center of the kettle over the leading edges 42b and 43b and towards and then over the trailing edges 42c and 43c. Such a construction causes a void in the gypsum generally behind the blades 42 and 43 and sets up a vortex effect in the gypsum in the kettle. In addition, such a construction draws the gypsum powder off of, and exposes, the burner tube coil 15 which is located radially outwardly from the blades 42 and 43. Preferably, the injection ports 48 are directed toward the burner tube coil 15 to blow the gypsum powder off of the burner tube 15 when it is exposed by the vortex effect which draws the powder towards the center of the kettle.

Each of the helical blades 42 and 43 is provided with an air pipe 46 and 47 along its breaking edge 42a and 43a, respectively. Each of the air pipes 46 and 47 includes a plurality of radially-directed ports 48 for injecting air into and fluidizing the kettle contents. The pressurized air is supplied to air pipes 46 and 47 by a line 49 connected to an internal passage 39a in shaft 39, and internal passage 39a is connected to air pipes 46 and 47 via passages 44a and 45a in support members 44 and 45. While a particular embodiment of mixing blades having air injection means along their breaking edges has been shown for purposes of illustration, it will be understood that the configuration of the mixing blades and the positioning of the air pipes and radially-directed ports may vary considerably.

In a preferred embodiment, the fluidization means preferably includes the fluidization means shown in FIGS. 4–7 and the fluidization means shown in FIGS. 8–9. Specifically, the second and third kettles 12 and 13, or all subsequent kettles after the first kettle 11, include both a plurality of air injection nozzles 34 about a periphery of the kettle shell 14 as well as mixing blades 42 and 43 having air injection pipes 46 and 47 along their breaking edges 42a and 43a for injecting air into the gypsum. Such a fluidization means combination ensures that the gypsum powder will be adequately fluidized with the fluidizing media, preferably air, during processing through the second and third kettles or any kettles subsequent to the first kettle. However, it will be understood that the fluidization means may take various forms, including various combinations of the different structures shown in FIGS. 3–9.

The method of this invention to calcine gypsum to produce an anhydrite product will now be described in connection with the particular apparatus shown in the drawings. The ground gypsum 20 is first fed into first kettle 11 using conveyor 18 and input riser 19, and the ground gypsum is then heated in the first kettle 11 to a first predetermined temperature of about 250° F.–380° F., preferably 310° F. The heated ground gypsum is then overflowed through overflow pipe 26 from first kettle 11 into second kettle 12. The ground gypsum in second kettle 12 is then heated to a second predetermined temperature higher than the first predetermined temperature while simultaneously fluidizing the gypsum in the second kettle 12. The second predetermined temperature is about 500° F.–800° F., preferably about 600° F., and the ground gypsum at that temperature will be a multi-phase product. The ground gypsum is then overflowed from second kettle 12 through overflow pipe 27 and into third kettle 13. The ground gypsum in the third kettle is then heated to a third predetermined temperature higher than the second predetermined temperature and simultaneously fluidized within the third kettle. The third predetermined temperature is preferably greater than 900° F., preferably greater than 930° F., to ensure that an insoluble anhydrite or dead burn product is recovered from the third kettle. The third predetermined temperature should fall within the range of 900° F.–1300° F. for producing dead burn and is preferably about 1000° F. The ground gypsum which is recovered from the third kettle consists essentially of calcium sulfate anhydrite in the form of insoluble anhydrite product or dead burn material, or if desired, may be soluble anhydrite if the third or final temperature is below 900° F. The recovered material is then sent by a conventional conveyor or the like to conventional means for cooling and packaging (not shown). The fluidization of the gypsum in the second and third kettles 12 and 13 may be accomplished in various ways, and the fluidization means in the second and third kettles may be the same or different. In the preferred embodiment, the mixing and fluidization means are combined, and the mixing blades include air injection pipes along their leading edges for fluidizing the kettle contents. In addition, the fluidization means also includes, in the preferred embodiment, a plurality of air injection nozzles 34 about a periphery of the kettle shell 14 to further fluidize or aerate the powdered gypsum in the second and third kettles 12 and 13. In one embodiment with three kettles as shown, the system was designed to have a flowthrough rate of 4 tons per hour and is currently being run at 2 tons per hour.

The method of this invention provides an efficient and effective method for recovering gypsum which consists essentially of calcium sulfate anhydrite from a calcining process without the expense of a refractory. By providing a fluidization means in the second and third kettles, or any subsequent kettles past the first kettle, the method overcomes problems with fluidization associated with many prior art devices.

While in the foregoing embodiments of the invention have been disclosed in considerable detail for purposes of illustration, it will be understood that many of these details may be varied without departing from the spirit and scope of the invention.

We claim:

1. A system for calcining gypsum and producing an anhydrite product, said system comprising:

at least two refractoryless kettles having a kettle shell defining an interior chamber for retaining ground gypsum, said kettles including a first kettle and at least one subsequent kettle;

heating means disposed in said kettles for circulating a heated media throughout said interior chamber of said kettles, said heated media being kept separate from gypsum contained in said kettles;

feeding means for feeding ground gypsum into said first kettle;

communication means for transferring heated ground gypsum from said first kettle to said at least one subsequent kettle; and fluidization means provided in said at least one subsequent kettle for fluidizing ground gypsum contained therein.

2. The system of claim 1 in which said fluidization means comprises at least one rotating blade provided in said at least one subsequent kettle having a plurality of injection ports along a breaking edge thereof and air supply means for injecting a fluidizing media through said plurality of injection ports to fluidize the gypsum contained in said at least one subsequent kettle.

3. The system of claim 2 in which said at least one blade comprises a first helically-twisted blade and a second helically-twisted blade extending vertically between an upper and a lower horizontal blade, said first and second helically-twisted blades each including an air pipe along the breaking edges thereof having a plurality of said injection ports which are radially-directed in said at least one subsequent kettle for injecting a fluidized media into said gypsum contained therein.

4. The system of claim 2 in which said heating means comprises a burner tube coil and said first and second helically-twisted blades have leading edges forwardly of said breaking edges and trailing edges rearwardly of said breaking edges, said injection ports of said air pipes on said breaking edges being directed towards said burner coil.

5. The system of claim 2 in which said first and second helically-twisted blades and said upper and lower horizontal blades are mounted on a central axle, and a pair of first and second horizontal support bars extend between said central axle and intermediate portions of said first and second helically twisted blades.

6. The system of claim 5 in which said central axle and said support bars include air injection passages, and an air source is connected to said air passage in said central axle for distributing air through said air passages and through the injection ports along the breaking edges of said first and second helically-twisted blades.

7. The system of claim 1 or 2 in which said fluidization means further comprises a woven web provided in a bottom of said at least one subsequent kettle and an air source for injecting a fluidized media through said woven web and into gypsum contained in said subsequent kettles.

8. The system of claim 7 in which a perforated screen which defines a plurality of apertures is provided over said woven mat.

9. The system of claim 7 in which said woven mat is formed of stainless steel.

10. The system of claim 1 or 2 in which said fluidization means further comprises a plurality of air injection nozzles disposed about a periphery of the kettle shells of said at least one subsequent kettle, and air source means connected to said plurality of nozzles for injecting air through said nozzles and into the kettle contents to fluidize the gypsum contained therein.

11. The system of claim 10 in which said air injection nozzles include a plurality of radially-directed ports and at least one axial port.

12. The system of claim 1 in which said at least two kettles comprise a first, second and third kettle.

* * * * *